(12) United States Patent
Jensen

(10) Patent No.: US 7,747,464 B2
(45) Date of Patent: Jun. 29, 2010

(54) MOTION PICTURE THEATER AND ASSOCIATED PROMOTION

(76) Inventor: Michael E. Jensen, 10731 Rockhurst Ave., Santa Ana, CA (US) 92705

( * ) Notice: Subject to any disclaimer, the term of this patent is extended or adjusted under 35 U.S.C. 154(b) by 1524 days.

(21) Appl. No.: 10/710,413

(22) Filed: Jul. 8, 2004

(65) Prior Publication Data

US 2004/0231002 A1    Nov. 18, 2004

Related U.S. Application Data

(60) Provisional application No. 60/545,733, filed on Feb. 18, 2004.

(51) Int. Cl.
*G06Q 30/00* (2006.01)
*G05B 19/418* (2006.01)

(52) U.S. Cl. .................. 705/14.35; 725/110; 705/8

(58) Field of Classification Search .......... 705/14; 725/110; 348/416; 382/239
See application file for complete search history.

(56) References Cited

U.S. PATENT DOCUMENTS

| 5,383,112 | A | | 1/1995 | Clark |
|---|---|---|---|---|
| 5,524,195 | A | * | 6/1996 | Clanton et al. ........... 725/61 |
| 5,619,247 | A | * | 4/1997 | Russo ................... 725/104 |
| 5,945,988 | A | * | 8/1999 | Williams et al. ......... 715/747 |
| 6,848,219 | B2 | * | 2/2005 | Standard et al. ............ 52/6 |
| 7,024,681 | B1 | * | 4/2006 | Fransman et al. ....... 725/115 |
| 7,134,130 | B1 | * | 11/2006 | Thomas .................. 725/25 |
| 2001/0037229 | A1 | | 11/2001 | Jacobs et al. |
| 2001/0039514 | A1 | | 11/2001 | Barenbaum et al. |
| 2002/0062236 | A1 | | 5/2002 | Murashita et al. |
| 2002/0091555 | A1 | | 7/2002 | Leppink |
| 2002/0095679 | A1 | * | 7/2002 | Bonini .................. 725/74 |
| 2002/0116235 | A1 | | 8/2002 | Grimm et al. |
| 2002/0161610 | A1 | | 10/2002 | Walker et al. |
| 2003/0069763 | A1 | | 4/2003 | Gathman et al. |
| 2003/0187802 | A1 | | 10/2003 | Booth |
| 2004/0133907 | A1 | * | 7/2004 | Rodriguez et al. ........ 725/14 |

* cited by examiner

*Primary Examiner*—Lynda Jasmin
*Assistant Examiner*—M. Victoria Vanderhorst
(74) *Attorney, Agent, or Firm*—McDermott Will & Emery LLP (57) ABSTRACT

A method of promoting and playing a motion picture at a theater in which the motion picture is not scheduled to begin at any particular time, the patron may visit the theater when convenient, and the motion picture begins a pre-determined period of time after the first patron arrives. The motion picture may begin earlier if a pre-determine level of patrons arrive. Various system are also described to support this process, including systems that delay the determination of the motion picture that will be played by a particular theater until after a visiting patron selects that motion picture. Applying these concepts to purchased or rented offices, apartments and condominiums is also disclosed.

1 Claim, 4 Drawing Sheets

MOTION PICTURE THEATER AND ASSOCIATED PROMOTION

CROSS-REFERENCE TO RELATED APPLICATIONS

This application is based upon and claims priority to U.S. Provisional Application Ser. No. 60/545,733, filed Feb. 18, 2004, entitled "Motion picture Theater With Showings Upon Capacity," the entire content of which is incorporated herein by reference.

BACKGROUND

1. Field

This application relates to the construction, operation and promotion of motion picture theaters.

2. Description Of Related Art

Motion pictures continue to be a popular form of entertainment and education. Unfortunately, the motion picture-going experience is not always optimal. This can reduce attendance and associated profit.

Motion pictures are usually played at theaters in accordance with a schedule. Sometimes, the schedule does not coincide with the available time of a prospective patron. This may lead to a loss of ticket revenue from that patron.

The process of going to a popular motion picture can also be stressful and/or frustrating. The patron may feel rushed in order to arrive at the motion picture theater before the motion picture is scheduled to begin. The patron may then arrive only to find a poor selection of seats or that no seats are available.

Some patrons may attempt to avoid these problems by arriving at the motion picture theater well ahead of the motion picture's scheduled start time. These patrons, however, often have to wait a long time in the theater before the motion picture begins. This inefficient use of patrons' time can also reduce the willingness of patrons to attend motion pictures.

Motion picture theaters also often require specialized buildings that can only be used to show motion pictures. This can limit the locations at which motion picture theaters can be opened. The specialized structure of the motion picture theater, moreover, may prevent it from being used for other non-motion picture, revenue-generating purposes.

SUMMARY

A method of promoting and playing a motion picture at a theater may include promoting the motion picture in a manner that communicates to a prospective patron that the motion picture is not scheduled to begin at the theater at any particular time, the prospective patron may visit the theater when convenient for the prospective patron, and the motion picture will begin shortly after the prospective patron arrives at the theater. The method may also begin playing the motion picture within no more than a pre-determined time period after a visiting patron arrives at the theater.

The promoting may be in a manner that also communicates to the prospective patron that the prospective patron must arrive at the theater within a time frame. The time frame may be defined by two stated times.

The promoting may be in a manner that also communicates to the prospective patron that the motion picture will begin within no more than a stated time period after the prospective patron arrives at the theater.

The motion picture may begin to play at the earlier of the following: the pre-determined time period after the visiting patron arrives at the theater; or when a pre-determined level of visiting patrons at the theater has been reached.

A method of playing a motion picture at a theater to a plurality of patrons may include beginning the motion picture at the earlier of the following: a pre-determined time period after the first patron arrives at the theater; or when a pre-determined level of the patrons at the theater has been reached.

The pre-determined level may be a function of the time of day.

The pre-determined time period may be a function of the time of day

The pre-determined level may be a function of the popularity of the motion picture.

The pre-determined time period may be a function of the popularity of the motion picture.

The theater may be in a complex of theaters and the pre-determined level may be a function of the number of theaters in the complex.

The theater may be in a complex of theaters and the pre-determined time period may be a function of the number of theaters in the complex.

A system for playing a motion picture at a theater to a plurality of patrons may include a projector for projecting the motion picture in the theater and a processing system configured to cause the projector to begin projecting the motion picture a pre-determined time period after the first of the plurality of patrons arrives at the theater.

The processing system may be further configured to cause the projector to begin playing the motion picture when a pre-determined level of patrons at the theater is reached, if earlier than the pre-determined time period after the first of the plurality of patrons arrives at the theater.

The pre-determined level may be a function of the time of day.

The pre-determined time period may be a function of the time of day.

The pre-determined level may be a function of the popularity of the motion picture.

The pre-determined time period may be a function of the popularity of the motion picture.

The theater may be in a complex of theaters and the pre-determined level may be a function of the number of theaters in the complex.

The theater may be in a complex of theaters and the pre-determined time period may be a function of the number of theaters in the complex.

The system may include an input system configured to receive and communicate information indicative of the arrival of at least the first of the plurality of patrons. The processing system may be further configured to receive the information from the input system and to use the information in determining when to cause the projector to begin projecting the motion picture.

The system may include a timing system configured to determine when the predetermined time period has elapsed.

A method of playing a plurality of different motion pictures in a complex containing a plurality of theaters may include receiving a selection of a motion picture from a patron that visits the complex that the patron wishes to see; determining which theater will play the motion picture selected by the patron after receiving the selection; directing the patron to the theater that has been determined to play the selected motion picture; and playing the selected motion picture at the theater that has been determined to play the selected motion picture.

A system for playing a plurality of different motion pictures in a complex containing a plurality of theaters may include a plurality of motion picture projectors, each located in a different one of the theaters; a network communication system; an electronic storage system configured to store the motion pictures; and a processing system configured to select one of the motion pictures from the electronic storage system in response to at least one request to see that motion picture by a patron that has visited the complex and cause that selected motion picture to be downloaded over the network to one of the projectors.

The processing system may also be configured to cause the selected motion picture to begin playing within no more than a pre-determined time period after the visiting patron arrives at the theater.

A method of constructing and operating a motion picture theater complex may include purchasing or renting a plurality of neighboring offices, apartments or condominiums in a building; installing a motion picture projector, a motion picture screen or display and a plurality of chairs facing the screen or display in each office, apartment or condominium without altering the size of any of the offices or apartments; selling tickets to see motion pictures in the offices, apartments or condominiums; directing patrons to the offices, apartments or condominiums to see the motion pictures that the patrons wish to see; and playing motion pictures in the offices, apartments or condominiums.

Each office, apartment or condominium may be adapted to be readily converted to at least one revenue-generating function other than the showing of motion pictures.

The method may further include switching the revenue-generating function of at least one of the offices, apartments or condominiums to the revenue-generating function that appears to generate the greatest profit.

These as well as still further features, objects, benefits, advantages, components and steps will now become clear upon a review of the Detailed Description of Illustrative Embodiments and the accompanying drawings.

DETAILED DESCRIPTION OF ILLUSTRATIVE EMBODIMENTS

Figure 1:
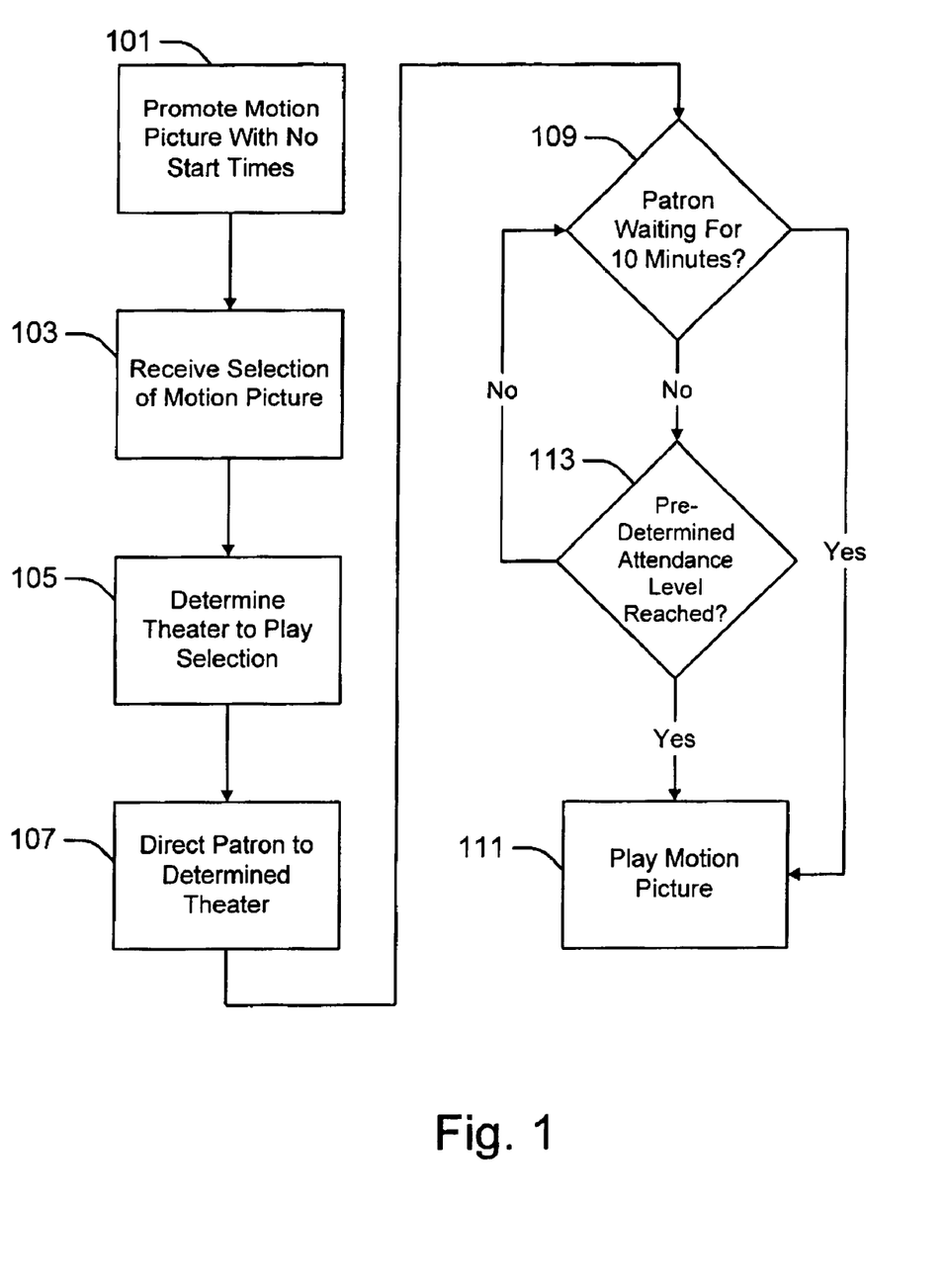
FIG. 1 is a flow diagram of one embodiment of a method of promoting and playing a motion picture at a motion picture theater.

FIG. 1 is a flow diagram of one embodiment of a method of promoting and playing a motion picture at a motion picture theater.

The method may include promoting the motion picture to prospective patrons, as reflected by a Promote Motion Picture With No Start Times step 101.

The promotion of the motion picture may take various forms and may include various content.

For example, the promotion may include an advertisement appearing in a newspaper, on television, on the radio, in motion picture previews, on billboards, and/or on websites. Additional or other forms of promotion may also be used.

The content of the promotion may vary widely. For example, the promotion may communicate to prospective patrons that the motion picture is not scheduled to begin at the theater at any particular time, that the prospective patron may visit the theater when convenient for the prospective patron, and/or that the motion picture will begin shortly after the prospective patron arrives at the theater. Information of this type may be communicated to prospective patrons in an express manner and/or in an implied manner.

Figure 2:
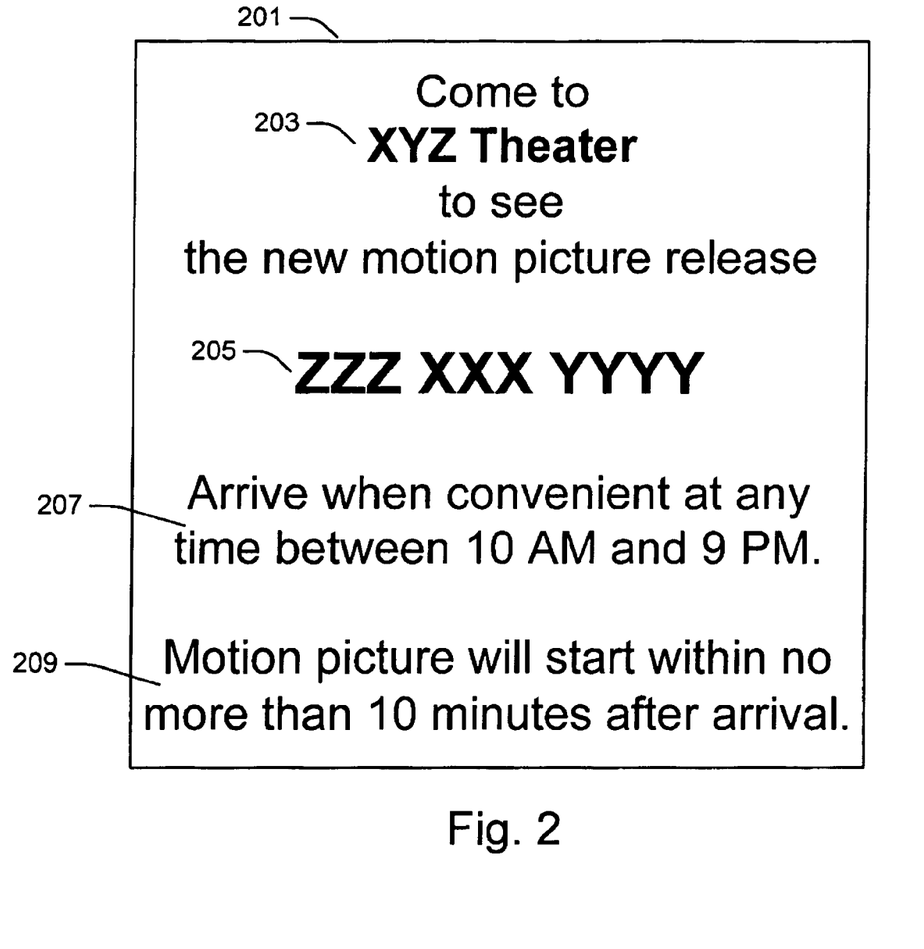
FIG. 2 is an example of an advertisement for a motion picture at a motion picture theater.

FIG. 2 is an example of an advertisement for a motion picture at a motion picture theater. As shown in FIG. 2, advertisement 201 may include information identifying the motion picture theater 203 and information identifying a motion picture 205 that will be played at the theater. The advertisement 201 may also include information communicating to prospective patrons that the motion picture is not scheduled to begin at the theater at any particular time, that the prospective patron may visit the theater when convenient for the prospective patron, and that the motion picture will begin shortly after the prospective patron arrives at the theater. Sentences 207 and 209 collectively communicate such information to prospective patrons.

As is apparent from an examination of sentences 207 and 209 the advertisement 201 may communicate to prospective patrons that the motion picture is not scheduled to begin at the theater at any particular time without express words to this effect. Similarly, the advertisement 201 may communicate to prospective patrons that they may visit the theater when convenient for them, without using language such as the "arrive when convenient" language that appears in sentence 207. For example, merely telling the patron that they may "arrive at any time between 10 AM and 9 PM" will inferentially communicate the same concept.

The advertisement 201 may include the recitation of a time period during which the theater is showing the motion picture, such as the "between 10 AM and 9 PM" that is recited in sentence 207. Of course, a different time period and/or different ways of stating such a time period may be used instead.

The information may also communicate that the motion picture will begin a short time after the arrival of the prospective patron without using words such as "will begin shortly after the patron arrives." For example, and as illustrated in sentence 209, the concept that the motion will begin a short time after the prospective patron arrives may be communicated with language that the motion picture will start within no more than a specified time interval after that arrival. Of course, different time intervals may be specified, such as five minutes or fifteen minutes.

Referring back to FIG. 1, the motion picture theater complex may receive a selection of a particular motion picture from a visiting patron, as reflected by a Receive Selection of Motion Picture step 103. For example, an arriving patron may visit a ticket booth in the motion picture theater complex and may tell the ticketing agent the name of the particular motion picture that the visiting patron wishes to see. Of course, other forms of communication may be used, including the operation of an automated ticket dispenser.

The motion picture theater complex may next determine which one of its theaters will play the motion picture that was selected by the visiting patron, as reflected by a Determine Theater to Play Selection step 105. This step may only be performed by a motion picture complex in connection with the arrival of the first patron that wishes to see a motion picture that no theater is at that time assigned to begin playing.

Once this first patron arrives, the motion picture complex may scan its theaters for the purpose of locating a theater that is empty and has not yet been scheduled to play a motion picture. The motion picture theater complex may then designate this theater to playing the motion picture selected by the visiting patron.

Some or all of the theaters could instead be assigned to playing one or more particular motion pictures before the visiting patron arrives. By delaying the assignment of a particular theater to a motion picture until after a patron requests that motion picture, on the other hand, greater flexibility and efficiency may be achieved.

The Determine Theater to Play Selection step 105 may be performed by any manual or computerized method.

The patron that requested the motion picture may next be directed to the determined theater, as reflected by a Direct Patron to Determined Theater step 107. This direction may be accomplished by any means, such as by a ticket taker, usher, sign and/or information that is printed on the patron's ticket.

Once a theater has been assigned to play a particular motion picture, the Determine Theater to Play Selection step 105 may not again need to be taken in connection with subsequent visiting patrons that select that motion picture, at least until the determined theater begins to play the selected motion picture. Once the determined theater begins to play the selected motion picture, on the other hand, the Determine Theater to Play Selection step 105 may again need to be performed in connection with the next visiting patron that selects the motion picture that has already begun to play.

A determination may next be made as to whether a visiting patron has waited for more than ten minutes to see the motion picture that he has selected, as reflected by a Patron Waiting for 10 Minutes? decision step 109. This step may be performed in connection with the first visiting patron that is directed to the determined theater. If the first visiting patron has been waiting for ten minutes, this information may cause the motion picture to begin playing, as reflected by a Play Motion Picture step 111.

Previews or other material may be played before the motion picture begins. This may give the visiting patron comfort in knowing that her movie-going experience has begun, while still giving time for other patrons to arrive and to be directed to the theater in which the previews or other material is still playing, all without causing them to miss any portion of the motion picture that they wish to see. In this embodiment, references herein to beginning the motion picture after a pre-determine time period are intended to also embrace the moment when previews or other material begin to play.

Although ten minutes has been specified in the example, any other period of time may be used instead, such as five or fifteen minutes. To attract prospective patrons, that period may be short in duration.

The point at which the period of time begins may also vary widely. For example, the period may begin at the moment the visiting patron purchases his ticket, hands it to a ticket collector, enters the designated theater, or sits in a seat in the designated theater. Manual and/or automated techniques may be used for determining when the pre-determined period has begun and/or lapsed.

If the pre-determined waiting period has not lapsed, a determination may next be made as to whether the attendance level at the designated theater has reached a pre-determined amount, as reflected by a Pre-Determined Attendance Level Reached? decision step 113. If the attendance level has reached the pre-determined amount, the motion picture may begin to play, as reflected by the Play Motion Picture step 111, even though the first-arriving patron has not yet waited for the pre-determined amount of time.

The pre-determined attendance level may be of any amount. For example, the pre-determined attendance level may be when the theater is full, when all but a specified percentage of the seats is filled, or a particular number that does not vary as a function of theater capacity.

The pre-determined waiting period and/or the pre-determined attendance level may vary as a function of other circumstances.

For example, the pre-determined waiting period and/or the pre-determined attendance level may vary as a function of the popularity of the motion picture. For motion pictures that are not very popular, a longer wait and/or only a low level of attendance may be required. For very popular motion pictures, on the other hand, only a short wait and/or a very high level of attendance may be required before the motion picture is started.

The pre-determined waiting period and/or pre-determined attendance level may also or instead vary as a function of the time of day. In early morning, a longer wait and/or only a low level of attendance may be required, while only a shorter wait and/or a larger number may be required during more prime motion picture-going times.

The pre-determined waiting period and/or pre-determined attendance level may also or instead vary as a function of the number of motion pictures that the complex is offering. If there is a large number of theaters with a relatively small number of films, the motion picture may begin after a shorter waiting period and/or with a lower level of attendance. Conversely, a complex having a small number of theaters with a large number of films may set the waiting time and/or attendance level higher.

Although the Patron Waiting For 10 Minutes? step 109 has been illustrated as being performed before the Pre-Determined Attendance Level Reached? step 113, the reverse order may be employed. In some embodiments, one or both of these steps may not be employed at all.

The motion picture theater may be configured to play motion pictures of any type, including motion pictures made of film and/or motion pictures that have been taken or converted into electronic format, including any type of analog and/or digital format.

Figure 3:
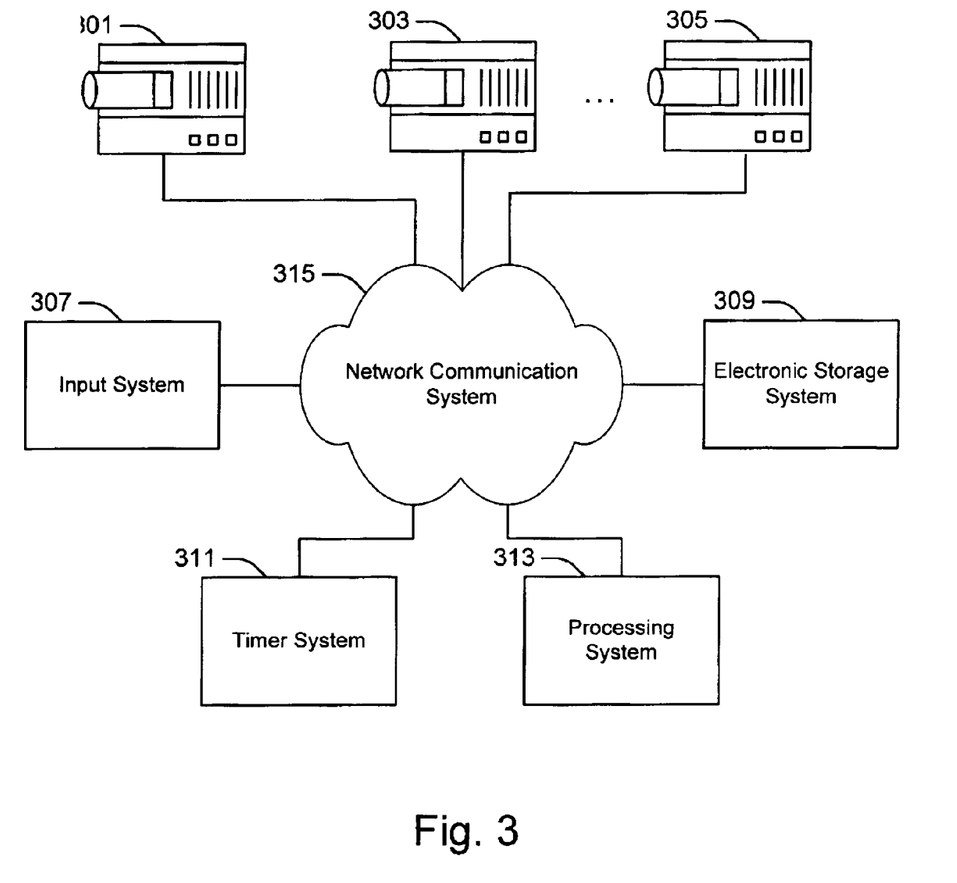
FIG. 3 is one embodiment of a motion picture theater complex configured to operate with films in electronic format.

FIG. 3 is one embodiment of a motion picture theater complex configured to operate with films in electronic format. As shown in FIG. 3, the motion picture theater complex may include a plurality of projectors 301, 303 and 305, an input system 307, an electronic storage system 309, a timer system 311, a processing system 313 and a network communication system 315.

Each of the projectors 301, 303 and 305 may be located in a separate theater. Multiple projectors may also be located in a single theatre. The projectors may include any type of projection technology, including LCD, DLP, CRT or plasma technology. The projectors may be front or rear projection. Each of the projectors may be configured to receive a motion picture in an electronic format, such as in an analog or digital format. Each of the projectors may be configured with a local storage system that can locally store one or more motion pictures and/or to play a motion picture while the electronic signal is being streamed to the projector. Although only three projectors are illustrated in FIG. 3, a greater or lesser number may also be used.

The electronic storage system 309 may be configured to store one or more motion pictures in electronic format. The format may be analog or digital. The format may be the same as the electronic format that is used by the projectors 301, 303 and/or 305, or it may be in a different format. If it is in a different format, an appropriate conversion system may be employed.

The electronic storage system 309 may include or be configured to work with any type of electronic storage device, including hard disks, DVDs, CDs and/or magnetic tape. The electronic storage system 309 may be located in the motion picture theater complex or may be located elsewhere.

All portions of the electronic storage system 309 may be at a single location or may be distributed over multiple locations. For example, each motion picture production company may provide its own electronic storage system, in which event the electronic storage system 309 may consist of a set of electronic storage systems, each provided by a different motion picture production company.

The processing system 313 may include any type of processing system, including a dedicated or general purpose computing system. The processing system 313 may include hardware and/or software. For example, the processing system 313 may include a personal computer configured with custom software.

The processing system 313 may or may not be located at the theater. It may also be a distributed processing system, in which event its different components may be at different locations.

The processing system 313 may be configured to cause the other components of the system to implement any function, including any or all of the functions that are described in this application.

The input system 307 may be configured to receive and to communicate various types of information to the processing system 313. For example, the input system 307 may be configured to receive and communicate information indicative of when each visiting patron arrives, along with the identify of the particular motion picture that each visiting patron has selected to view. The input system may be a ticket dispensing machine that issues a notice when each ticket is issued, along with the identify of the motion picture for which the ticket has been issued. The input system 307 may also communicate other information, such as the time when a ticket has been issued.

The input system 307 may include a keyboard. The input system 307 may include devices that automatically detect the entry of a visiting patron in a particular theater. An optical sensor, such as a beam and an associated photo cell, may be positioned to advantageously detect and communicate this entry information. More sophisticate types of sensors may also be used.

The timer system 311 may include any type of system that is capable of timing an event, such as the time that elapses since the first visiting patron enters a theater that is not currently playing a motion picture. For example, the timer system 311 may record the time at which this person enters, based on information received from the input system 307, and then check that time against a clock to determine when the patron has been waiting for a pre-determined amount of time. The timer system 311 may in addition or instead simply initiate a countdown timer after the first visiting patron arrives in the theater and issue a notice when the time has elapsed.

The network communication system 315 may be any type of network communication system. It may be configured to communicate information between the various components in the system. The network communication system 315 may be wireless, wired and/or a combination of both. The network communication system 315 may include the Internet, a local area network, a wide area network, and/or any other type or combination of network communication systems.

The components shown in FIG. 3 may be configured to operate in a variety of ways. In one embodiment, the input system 307 may detect when each visiting patron arrives and may communicate this information, along with the motion picture that the visiting patron has selected, over the network communication system 315 to the processing system 313. If this is the first visiting patron to arrive to see the selected motion picture, the processing system 313 may send an appropriate signal to the timer system 311 over the network communication system 315 to cause the timer system 311 to initiate a countdown timer.

At approximately the same time, the processing system 313 may also select the theater in which the selected motion picture will play. It may then send an appropriate signal over the network communication system 315 to the electronic storage system 309 to have that motion picture delivered to the projector that is in that theater, such as projectors 301, 303 and/or 305. If the projector includes local storage, it may signal the electronic storage system 309 to download the selected motion picture immediately. Otherwise, it may delay the downloading of the motion picture from the electronic storage system 309 until it has decided to begin playing the motion picture.

As additional visiting patrons arrive to see the selected motion picture, the processing system 313 may continue to receive information about their arrival from the input system 307. When the attendance reaches the pre-determined level, or when the timer system 311 communicates that the pre-determined waiting time has been reached, the processing system 313 may then signal the projector in the selected theater to begin playing the motion picture.

Using appropriate multi-tasking techniques, the processing system 313 may perform the same series of operations in connection with the other motion pictures that the other visiting patrons have selected. In this embodiment, the timer system 311 may also be configured to time multiple events simultaneously.

Figure 4:
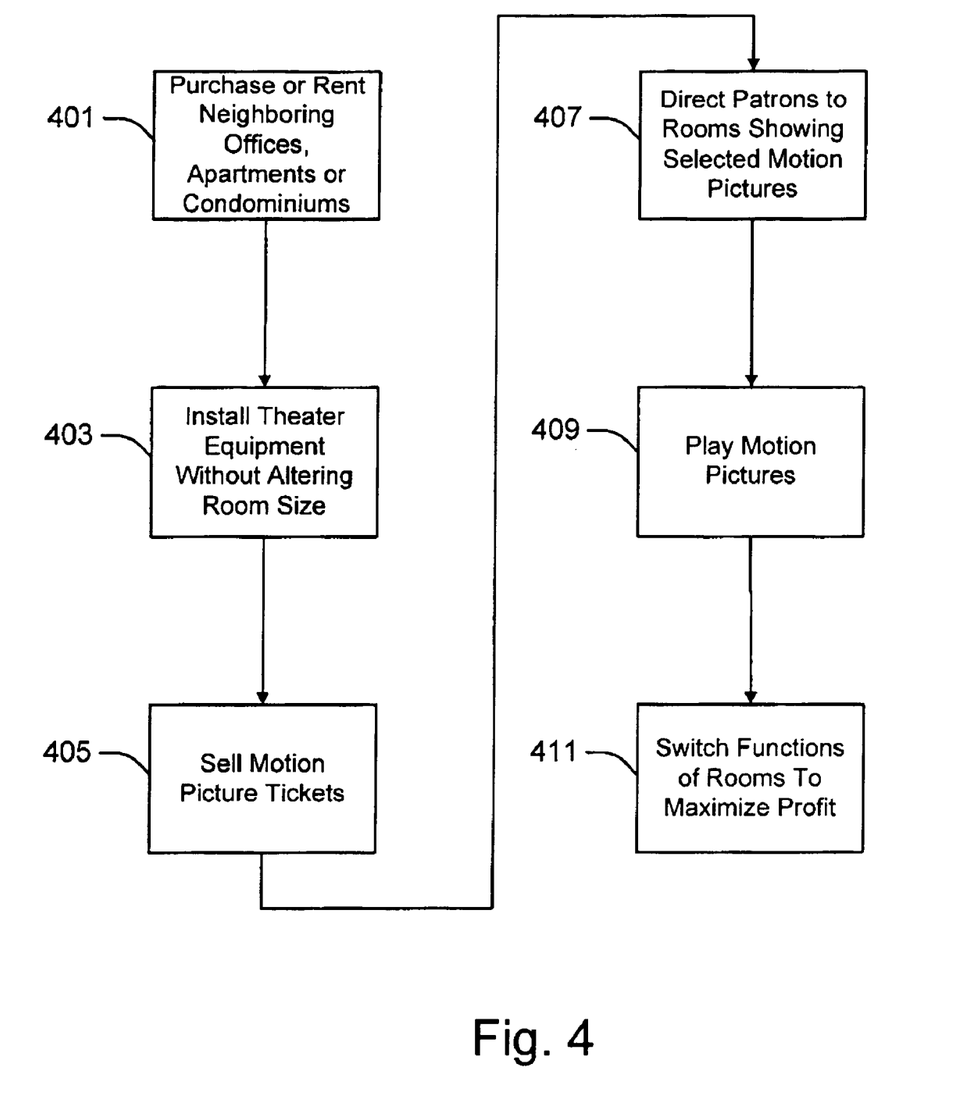
FIG. 4 is one embodiment of a method for constructing and operating a motion picture theater complex.

FIG. 4 is one embodiment of a method for constructing and operating a motion picture theater complex. As shown in FIG. 4, a set of neighboring offices, apartments or condominiums may be purchased or rented, as reflected by a Purchase or Rent Neighboring Offices, Apartments or Condominiums step 401.

Neighboring offices, apartments or condominiums may often be vacant. This may provide an opportunity to economically construct and operate of a motion picture theater.

Normally, the typical office, apartment or condominium might be too small to function as a motion picture theater could be profitably run. The opposite, however, may be the case when one or more of the systems and processes described above are incorporated into the motion theater complex.

The offices, apartments or condominiums that are rented or purchased may neighbor one another. This neighboring would not necessarily be disrupted by the inclusion of a few rooms within the group that could not be purchased or rented.

The building that houses the offices, apartments or condominiums may also be purchased or rented as part of the purchase or rental of the offices, apartments or condominiums.

Theater equipment of the type discussed above may then be installed in each room without altering the size of each room, as reflected by an Install Theater Equipment step 403. For example, a projector, screen and chairs facing the screen may be installed in each room.

After completing some or all of this construction, the new motion theater complex may begin selling tickets to motion pictures, as reflected by a Sell Motion Picture Tickets step 405. An entryway to the neighboring rooms may advantageously be used as a location at which these tickets may be sold. Visiting patrons may then be directed to the rooms that are showing the motion pictures that they selected, as reflected by a Direct Patrons to Rooms Showing Selected Motion Pictures step 407. This step may be implemented in accordance with the systems and processes discussed above.

The selected motion pictures may then be played in the theaters, as reflected by a Play Motion Pictures step 409. Again, this step may be implemented in accordance with the systems and methods described above.

It may turn out that one or more of the theaters are not operating at a very profitable level. For example, the attendant at the motion picture theater complex may not be sufficient and/or the operating costs may be excessive. Anticipating this possibility or at any later point in time, one or more of the rooms may be configured so that they can be readily converted to at least one revenue-generating function, other than the showing of motion pictures. For example, one or more of the rooms may be configured so that it can be readily be configured to sell merchandise or food.

At various times during the operation of the motion theater complex, one or more of these convertible rooms may be converted to providing a business function other than the playing of motion pictures, as reflected by a Switch Functions of Rooms To Maximize Profit step 411. One or more of these switches may be made for the purpose of maximizing the profit that the room generates.

The option of having rooms of small size also opens up the prospect of offering private viewings for small groups, such as a private party. In this embodiment, an entire viewing room may be reserved for a group. The motion picture may be scheduled in the private viewing room to begin at a time that is also reserved. After the motion picture has screened, the room may be used for other purposes, such as for a meeting of the group to discuss the motion picture or to carry on with a party.

The features, objects, benefits, advantages, components and steps that have been discussed are merely illustrative and are not to be interpreted as limiting the scope of the protection in any way. Numerous other embodiments are also contemplated, including embodiments that have fewer, more, and/or different features, objects, benefits, advantages, components and steps. The components and steps may also be arranged or ordered differently. In short, the scope of protection is limited solely by the claims that now follow.

The invention claimed is:

1. A system for playing a motion picture to a plurality of patrons in a theater within a complex of theaters comprising:
   a projector configured to projecting the motion picture in the theater;
   an input system configured to receive information indicative of an arrival of each of the patrons at the theater;
   a timing system configured to determine when a predetermined time period has elapsed after the arrival of the first of the patrons at the theater; and
   a processing system configured to:
      receive the information indicative of the arrival of each of the patrons at the theater and to cause the projector to begin projecting the motion picture at the earlier of the following times:
         when the timing system indicates that the pre-determined time period after the first of the plurality of patrons arrives at the theater has elapsed, or
         when the information from the input system indicates that a pre-determined number of the patrons has arrived at the theater; and
      adjust the pre-determined time period after the first of the plurality of patrons arrives has elapsed and the pre-determine number of patrons based of time of day, popularity of the motion picture, and number of theaters within the complex.

* * * * *

UNITED STATES PATENT AND TRADEMARK OFFICE
CERTIFICATE OF CORRECTION

PATENT NO.         : 7,747,464 B2                                          Page 1 of 1
APPLICATION NO.    : 10/710413
DATED              : June 29, 2010
INVENTOR(S)        : Michael E. Jansen It is certified that error appears in the above-identified patent and that said Letters Patent is hereby corrected as shown below:

Title Page, Item (76)
Please correct the inventor's name as shown above:

"Jensen" should be changed to --Jansen--

Signed and Sealed this

Tenth Day of August, 2010

David J. Kappos
*Director of the United States Patent and Trademark Office*